(12) United States Patent
Ghabbour et al.

(10) Patent No.: US 9,248,748 B2
(45) Date of Patent: *Feb. 2, 2016

(54) VEHICLE INTERFACE WITH NON-LOCAL RETURN TO GROUND

(75) Inventors: Youssef Ghabbour, Valls (ES); Miguel Angel Aceña, Valls (ES)

(73) Assignee: Lear Corporation, Southfield, MI (US)

( * ) Notice: Subject to any disclaimer, the term of this patent is extended or adjusted under 35 U.S.C. 154(b) by 810 days.

This patent is subject to a terminal disclaimer.

(21) Appl. No.: 13/372,805

(22) Filed: Feb. 14, 2012

(65) Prior Publication Data

US 2013/0175988 A1 Jul. 11, 2013

Related U.S. Application Data

(60) Provisional application No. 61/583,718, filed on Jan. 6, 2012.

(51) Int. Cl.
| | |
|---|---|
| *H02J 7/00* | (2006.01) |
| *B60L 11/18* | (2006.01) |
| *B60L 3/00* | (2006.01) |
| *H01H 1/00* | (2006.01) |
| *H02H 1/00* | (2006.01) |

(52) U.S. Cl.
CPC ........... *B60L 11/1816* (2013.01); *B60L 3/0069* (2013.01); *B60L 11/1824* (2013.01); *H01H 1/00* (2013.01); *H02H 1/00* (2013.01); *B60L 2230/12* (2013.01); *B60L 2270/147* (2013.01)

(58) Field of Classification Search
CPC .................................................. B60L 11/1816
USPC .......................................................... 320/109
See application file for complete search history.

(56) References Cited

U.S. PATENT DOCUMENTS

| | | | |
|---|---|---|---|
| 6,462,510 B1 * | 10/2002 | Takada et al. | 320/116 |
| 7,904,217 B2 | 3/2011 | Miller | |
| 2011/0216451 A1 | 9/2011 | Haines et al. | |
| 2012/0098490 A1 * | 4/2012 | Masuda | 320/109 |
| 2014/0084676 A1 * | 3/2014 | Berman | 307/9.1 |

FOREIGN PATENT DOCUMENTS

| | | |
|---|---|---|
| CN | 101977804 A | 2/2011 |
| WO | WO 2010150360 A1 * | 12/2010 |

OTHER PUBLICATIONS

Chinese Office Action for corresponding Application No. 201210576858.3, mailed Aug. 5, 2014, 5 pages.

* cited by examiner

*Primary Examiner* — Richard Isla Rodas
*Assistant Examiner* — David V Henze-Gongola
(74) *Attorney, Agent, or Firm* — Brooks Kushman P.C.

(57) ABSTRACT

A vehicle interface is contemplated to be operable with an Electronic Vehicle Supply Equipment (EVSE) system and a vehicle charging system to facilitate vehicle charging related operations. The vehicle interface may include a noise compensation configured to facilitate compensating for noise within the reference signal resulting from the reference circuit. The vehicle interface may be configured to adapted to common mode interference and other influences resulting from connections between the vehicle interface and EVSE being referenced to earth ground and connections between the vehicle interface and other vehicle electronics being reference to a vehicle chassis ground.

20 Claims, 3 Drawing Sheets

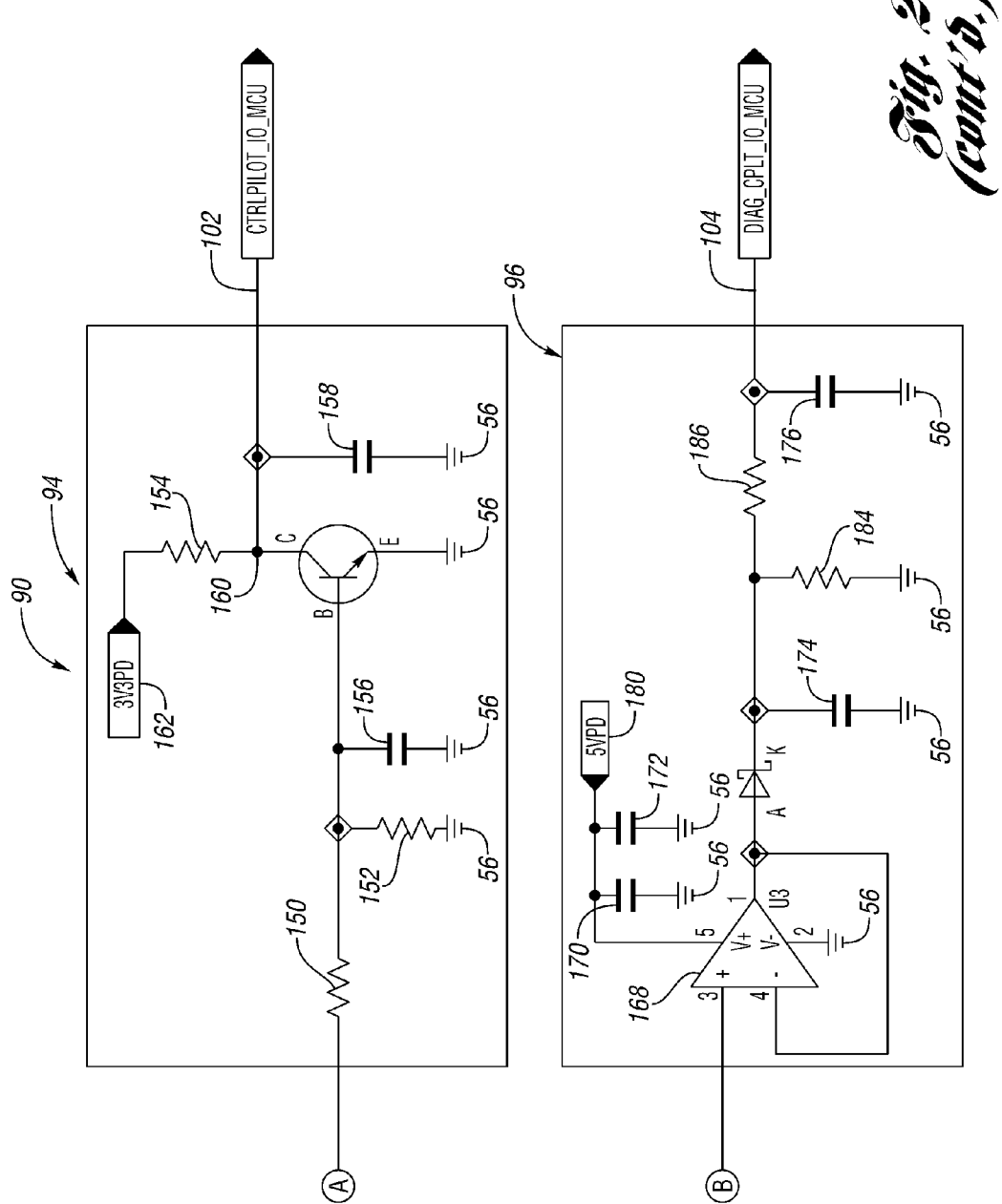

VEHICLE INTERFACE WITH NON-LOCAL RETURN TO GROUND

CROSS-REFERENCE TO RELATED APPLICATIONS

This application claims the benefit of U.S. provisional Application No. 61/583,718 filed Jan. 6, 2012, the disclosure of which is incorporated in its entirety by reference herein.

TECHNICAL FIELD

The present invention relates to interfaces used to facilitate charging operations associated with an Electronic Vehicle Supply Equipment (EVSE) system and a vehicle charging system, such as but not limited to systems configured to facilitate charging a high voltage DC vehicle battery with AC energy supplied from the EVSE system.

BACKGROUND

An operation amplifier, buffer, or other device may be configured to receive a signal at first input and to tie a second input to ground in order to generate an output signal representative of a voltage at the signal received at the first input. The tying of the second input to ground can be problematic to the generation of the output signal in the event the ground connection floats or experiences other electrical disturbances. One non-limiting aspect of the present invention contemplates the use of a vehicle interface where the vehicle interface has a non-local ground relative to other components of the vehicle interface, and in particular, ameliorating the affects of the non-local ground on the generations of a output signal.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
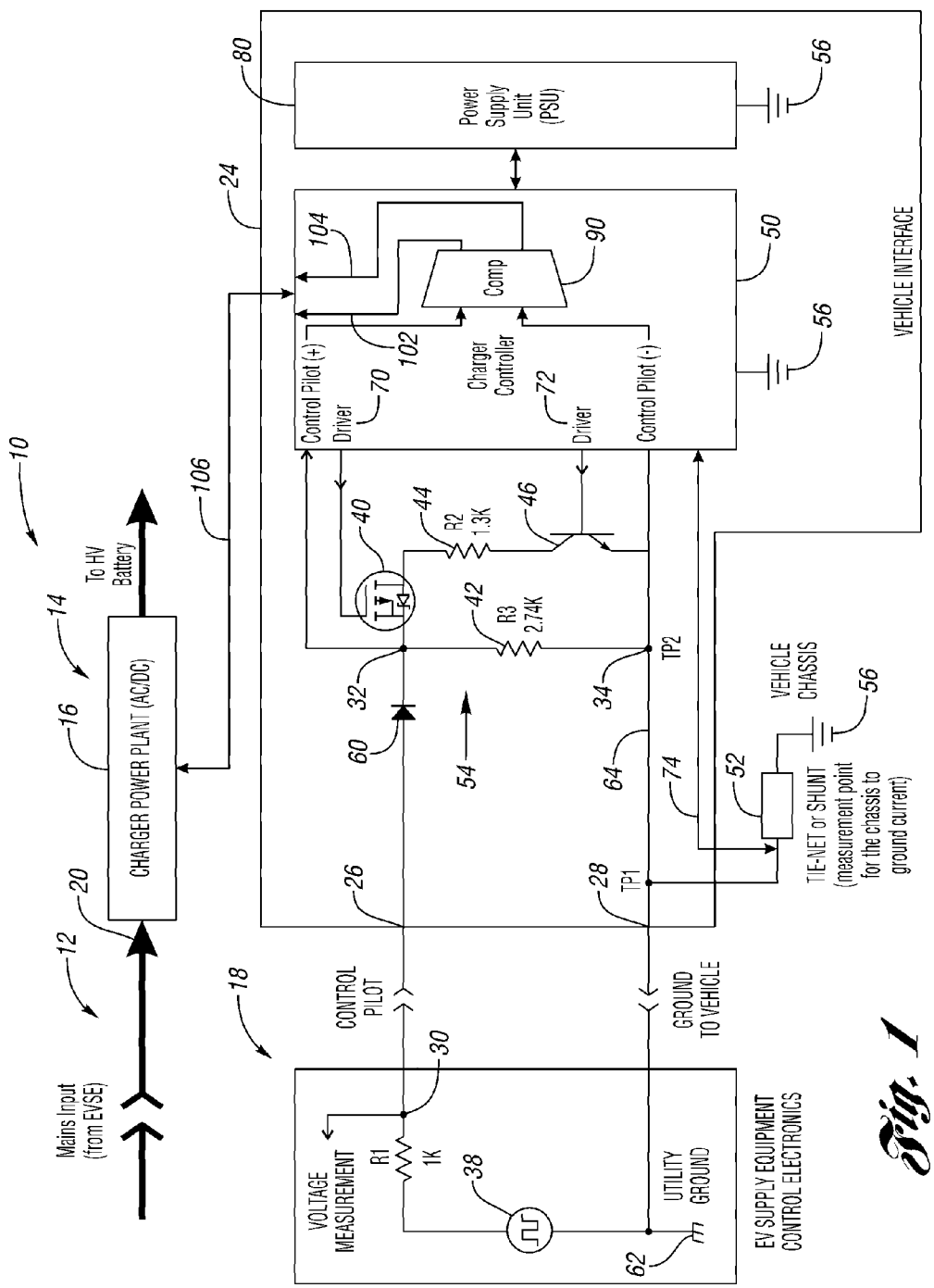
FIG. 1 illustrates a charging system as contemplated by one non-limiting aspect of the present invention.

FIG. 1 illustrates a charging system 10 having an Electric Vehicle Supply Equipment (EVSE) system 12 configured to provide energy to a vehicle charging system 14 as contemplated by one non-limiting aspect of the present invention. The EVSE system 12 may be configured to provide AC energy to a charger power plant 16 on the vehicle for conversion to DC energy sufficient for charging a high voltage (HV) battery (not shown) or other electronic storage element included within a vehicle. The EVSE system 10 may be associated with a wall outlet system or other system sufficiently configured to provide AC energy to the charger power plant 16, such as in the manner described within SAE J1772, the disclosure of which is hereby incorporated by reference in its entirety. In addition to or in place of detection logic or other features, the EVSE system 12 may include a control pilot circuit 18 through which the vehicle charging system 14 is required to communicate whether the charger power plant 16 is ready to receive the AC energy.

A cordset (not shown) may be configured to facilitate connecting the EVSE system 12 to a receptacle (not shown) included within the vehicle. The receptacle and/or another feature within the vehicle may include an input for connecting to a mains input 20 through which AC energy flows from the EVSE to the charger power plant 16 for conversion to energy sufficient for charging high voltage battery. A vehicle interface 24 may be included to facilitate connection with the control electronics portion 18 of the EVSE system. The vehicle interface 24 may include control pilot input 26 for receiving a control pilot signal from the EVSE system 12 and an earth/utility ground input 28 for connecting to an earth/utility ground of the EVSE system 12. The control electronics portion 18 and the vehicle interface 24 may be low voltage and/or low current systems and electrically isolated from the mains input 20. Once connected, the control pilot signal may be used to generate a voltage reference at voltage measurement nodes 30, 32, 34 to reflect whether the charger power plant 16 is ready to receive DC energy through the mains connection 20. A controller (not shown) associated with the EVSE system 12 may permit or deny delivery of the AC energy to the mains connection 20 depending on the reference voltage.

The control pilot signal may be generated using an oscillator 38 or other device having suitable capabilities to generate control pilot signal, including but not limited to the control pilot signal required by SAE 1772. The vehicle interface 24 may include a first switch 40, a first resistor 42, a second resistor 44, and a second switch 46 connected in series and in parallel to the first resistor 42. The first switch 40 and the second switch 46 may be operable between an open position and a closed position. The closed position may correspond to the switches 40, 46 conducting current and the open position may correspond with the switches 40, 46 being unable to conduct current. The "on" (closed position) and "off" (open position) switch voltages may be configured in accordance with the present invention as described below in more detail. In the absence of a contrary command, the first and second switches 40, 46 may be configured to maintain their current position, i.e., to remain in one of the open and closed positions when no signal is received commanding the switch to change positions. While the present invention fully contemplates use of a single one of the first and second switches 40, 46 facilitating setting the reference voltage, it is believed that use of both of the first and second switches 40, 46 may be more advantageous in order to ensure at least one of the switches opens when desired.

The voltage measured at the voltage measurement nodes 30, 32, 34 may vary depending on whether the first resistor 42 and the second resistor 44 are connected in parallel. The control pilot signal may be generated as at a constant DC voltage to facilitate measurement of a first and second reference voltage. Optionally, the control pilot signal may be output as an AC, PWM, signal or other time-varying signal sufficient to convey data and other information to the vehicle charging system, such as through corresponding voltage variations at the second measurement node 32. The use of the DC control pilot signal is predominately described to facilitate use of an EVSE controller (not shown) to adjust and/or prevent delivery of the AC energy to the mains connection 20 depending on whether the first reference voltage or second reference voltage is detected. Likewise, a charger controller 50 and/or a controller associate with the charger power plant may rely on detection of the first and second reference voltage to facilitate controlling charger operations. The first reference voltage may be associated with the first and second switches 40, 46 being in the closed position such that the first and second resistors 42, 44 are connected in parallel. The second reference voltage may be associated with either one of the first and second switches 40, 46 being in the open position such that the second resistor 44 is disconnected.

The vehicle charger controller 50 may be a Micro-Controller Unit (MCU) configured to monitor various operating conditions of the charger power plant 16 in order to assess whether the charger power plant 16 is ready to receive AC energy from the EVSE system 12. The vehicle charger controller 50 may also be configured to control various charging operations of the charger power plant 16, including assessing whether the HV battery or other element being charged is sufficiently charged or other conditions in which further delivery of the AC energy from the EVSE system 12 is undesirable. Upon completion of the charging event or other condition, the vehicle charger controller 50 may adjust control of the first and/or second switches 40, 46 in a manner sufficient to open the second switch 46, and thereby change the reference voltage and notify the EVSE controller to cease further delivery of AC energy. Optionally, the vehicle charging system 14 may include other means for communicating completion of the charging event to the EVSE system 12 such that the operations associated with opening the second switch 46 may be redundant or a secondary means for ensuring the EVSE controller is instructed to cease delivery of AC energy.

A shunt 52 may be connected in series between a reference circuit portion 54 of the vehicle interface 50 and a vehicle chassis ground 56. The reference portion 54 may correspond with the first and second switches 40, 46 and the first and second resistors 42, 44, and optionally, a rectifier diode 60 to rectify the signal coming from the control pilot oscillator 38. The positioning of the shunt 52 in series between the vehicle chassis ground 56 and an earth ground 62 associated with the EVSE system causes a corresponding reference circuit ground 64 of the reference circuit portion 54, which is approximately equal to the earth ground 62 of the EVSE system, to be greater than the vehicle chassis ground 56. The amount by which the earth ground 62 is greater than the vehicle chassis ground 56 is in proportion to the resistive value of the shunt. This voltage differential between the earth ground and the vehicle chassis ground can produce common mode interferences and other electrical inconsistencies. One particular concern relates to switching operations or other electrical activities within the vehicle causing the shunt 52 to induce a voltage differential which prevents or otherwise hinders the capability of the charger controller 50 to bias the first and second switches 40, 46 to the desired open and/or closed position.

To limit the influence of this voltage differential, one non-limiting aspect of the present invention contemplates powering or otherwise controlling biasing of the first and second switches 40, 46 with first and second drivers 70, 72. The first and second drivers 70, 72 may be configured to operate independently of voltage interferences and differentials, and in particular, independently of electrical variations associated with use of the shunt 52 between the earth ground 62 and the vehicle chassis ground 56. The chassis ground 56 may correspond with a vehicle ground associated with a negative terminal of the low-voltage battery (not shown) included within the vehicle. The low voltage battery may be distinct from the high voltage battery used to facilitate electric driving and other high voltage electric operations of the vehicle. The low-voltage battery maybe a 12-16 V or 42 V DC battery configured to facilitate powering various vehicle electronics, as one having ordinary skill in the art will appreciate.

The shunt 52 may be included between the reference circuit portion 54 of the vehicle interface 24 and the chassis ground 56 in order to provide a feedback measurement to the charger controller 50. The charger controller 50 may be configured to monitor a third reference voltage 74 at the shunt 52 in order to detect inconsistencies or other interference concerns regarding the capability of the EVSE system 12 to properly facilitate the desired high voltage charging operation. The ability of the shunt 52 to provide this measurement may be useful in detecting whether charging being performed by the charger power plant 16 is operating properly as some improper operations may result in disturbances within the vehicle that are reflected in changes in the third reference voltage 74. For example, in the event the vehicle chassis ground 56 has been compromised in some way during a charging operation, the third reference voltage 74 may decrease due to a change in current through the shunt 52 such that the charger controller 50 may detect the variance and instigate an action to discontinue the charging operation.

A power supply unit 80 may be included to facilitate powering the charger controller 50 and/or the first and second drivers 70, 72 associated with controlling the first and second switches. The power supply unit 80 and the charger controller 50 may be directly connected to the vehicle chassis 56 in that the charger controller 50 and the power supply unit 80 bypass the shunt 52 to be grounded directly to the vehicle chassis ground 56. This type of configuration results in the reference circuit portion 54 of the vehicle interface 24 being associated with a non-local return ground in comparison to the charger controller 50 and the power supply unit 80 since the charger controller 50 and the power supply unit 80 bypass the shunt 52 to be connected directly to the vehicle chassis ground 56, i.e., the charger control 50 and the power supply unit 80 are not subject to the voltage differential induced by the shunt 52 between the vehicle chassis ground 56 in the earth ground/reference circuit ground 62, 64. In the event the shunt 52 were to be removed from the system 10, which is fully contemplated by the present invention, the reference circuit portion 54 would share the same ground as the vehicle chassis 56 such that the two would be approximately equal.

Figure 2:
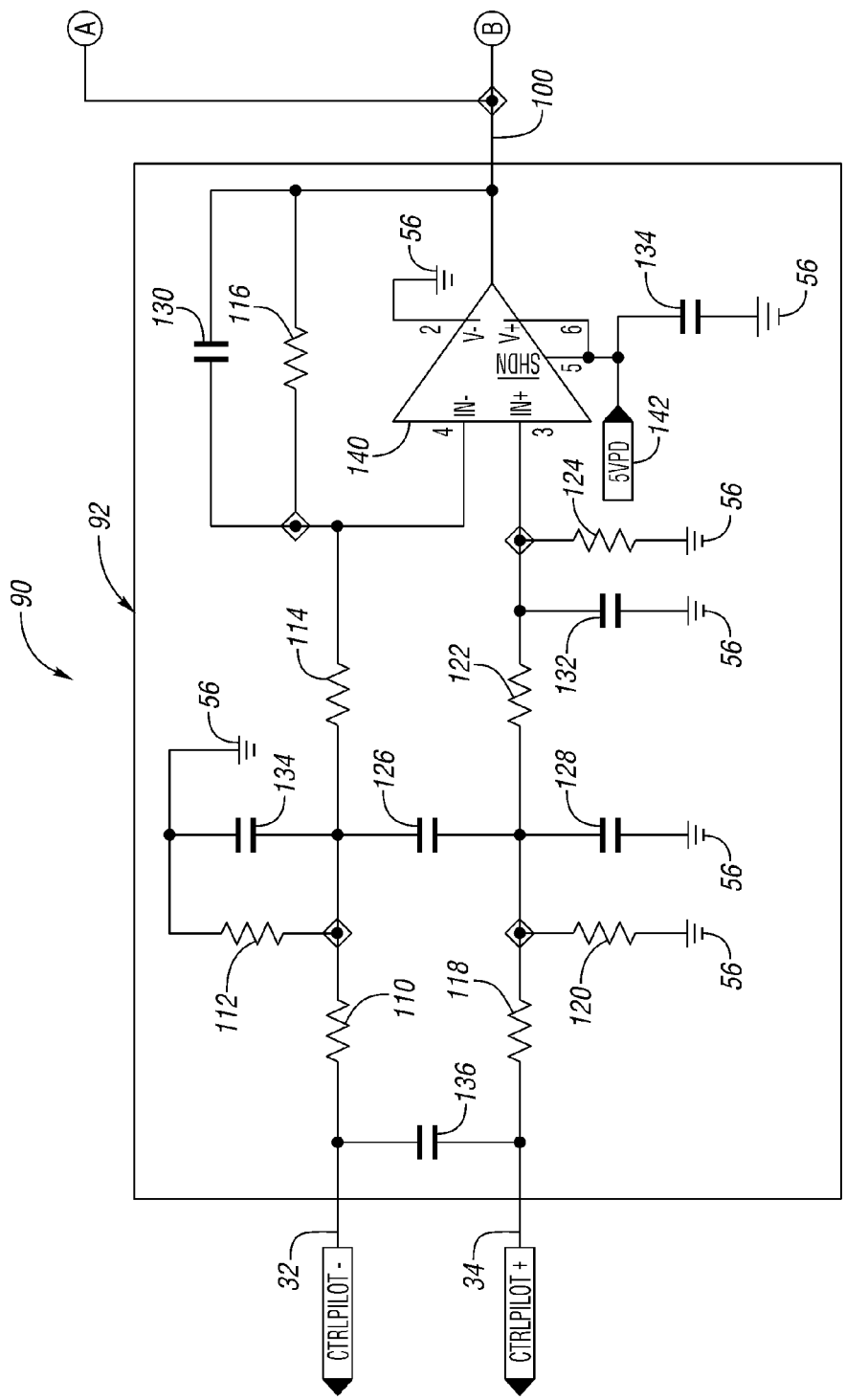
FIG. 2 illustrates a schematic of a vehicle interface as contemplated by one non-limiting aspect of the present invention.

FIG. 2 illustrates a compensation device 90, which may also be referred to interchangeably herein as an interfacing or conditioning, as contemplated by one non-limiting aspect of the present invention. The compensation device 90 may be configured to include a differential amplifier 92, a level shifter 94, and voltage follower and peak detection unit 96. The differential amplifier 92 may be configured to process the signals measured as the first and second measurement nodes 32, 34 into a subtracted signal 100. The level-shifter 94 and the unit 96 may be configured to process the subtracted signal 100 into a shifter signal 102 and a unit signal 104. The shifter and unit signals 102, 104 may be output in combination or alone as a control signal 106 to the charger power plant 16 (see FIG. 1). The charger power plant 16 may rely on this control signal 106 to facilitate related control of vehicle charging operations. The charger power plant 16 may determine whether the EVSE system 12 is ready to provide energy based on whether the unit signal 104 is at a first or second reference voltage. The charger power plant 16 may determine the amount of current and/or condition of the energy output from the EVSE 12 as a function of data included in the unit signal 104.

The compensation device 90 may be configured to output the shifter and unit signal 102, 104 to the charger power plant 16 when the control pilot signal is active and/or depending on the shape and/or other characteristics of the control pilot signal. The shifter signal 102 may be desirable when the control pilot signal is a DC signal or a non-time varying signal, and particularly useful when the control pilot signal is a time-varying signal. When used with a time-varying or PWM signal, the shifter signal 102 can be used to facilitate tracking by an MCU of the charger power plant 16 at lower power levels, e.g. 0-3.3 VDC range when signal 100 is in the range of 0-5 VDC. This configuration may be used to convey connection and readiness of the EVSE mains 20 to provide energy to the charger power plant 16. The shifter signal 102 may be desirable when the control pilot signal is an AC signal or a time-varying signal, such as after the initial connection of the EVSE mains 20 to the charger power plant 16 and prior to actual delivery of energy when the control pilot signal may be time-varying in order to convey charging capabilities of the EVSE system 12. The capabilities or other data associated with the EVSE system 12 may be conveyed as a time-varying component of the control pilot signal, which may be processed with the unit 94 to generate a corresponding shifter signal 102 understood by the charger power plant 16.

In this manner, the level-shifter 94 may be configured to change peak-to-peak voltage from the incoming PWM (signal 100) to a level readable by the microcontroller of the charger power plant 16. The charger power plant 16 can then measure the duty cycle from and collect information about the available energy to charge the battery (maximum current . . . ). The peak detection unit 96 may be configured to assess the DC value or the "high" voltage of the PWM input (signal 100). With this stage, then, the charger power plant 16 can determine an indication from the EVSE 12 about the availability of the AC supply and, also, it can verify the feedback provided when closing/opening the first and second switches 40, 46.

The present invention contemplates generating the control signal 106, i.e., the shifter and unit signals 102, 104, in a manner that compensates for the non-local grounding of the reference circuit 24. The differential amplifier 92 may be configured to facilitate subtracting the signal measured at the first measurement 32 of the reference circuit from those measured at the second measurement node 34. This subtraction of one signal from the other compensates for voltage variation, common mode noise, and other interferences causing the reference circuit ground 64 to vary relative to the vehicle chassis ground 56. The subtraction performed by the differential amplifier 92 results in the subtracted signal 100 reflecting a difference between the first and second measurement nodes 32, 34 of the reference circuit 24 and without regard to voltage variations of the non-local ground (reference circuit/ earth ground 62, 64). Of course, the present invention fully contemplates obtaining this difference without subtracting the signals at the first and second reference nodes 32, 34 from each other, such as by simply measure the signals a the first measurement node 32 relative to the reference circuit ground 64 and/or vehicle chassis ground 62, however, this determination of the difference may fail to sufficiently account for variances in the ground 62, 64 used as the differential reference point.

The differential amplifier 92 contemplated by the present invention ameliorates and/or eliminates reliance on both of the non-local ground 62, 64 and vehicle chassis ground 56 when performing the differential analysis in an effort to compensate for the noise and other variations associated therewith. The differential amplifier 92 may be configured to facilitate the contemplated measurement with first 110, second 112, third 114, fourth 116, fifth 118, sixth 120, seventh 122, and eighth resistors 124; first 126, second 128, third 130, fourth 132, fifth 134, sixth 136, and seventh capacitors 138; an amplifier 140, and the illustrated interconnection of these components. These components of the differential amplifier 92 are shown to be referenced to the vehicle chassis ground 56 with a voltage regulator 142 connected to a low voltage battery (not shown) of the vehicle providing a constant reference voltage supply to the amplifier 92. As soon as the amplifier 92 has one of their inputs referenced to node 34 by means of the network formed by 118, 120, 128, 122, 132, and 134, then it is capable of amplifying the signal of node 32 at the time it discounts the influence of node 34 from it.

The subtracted signal 100 output from the differential amplifier 92 may be commonly provide to the level shifter 94 and the voltage follower and peak detection unit 96. The voltage follower 94 may be comprised of first 150, second 152, and third resistors 154; first and second capacitors 156, 158, a switch 160; and a voltage regulator 162 connected to the low voltage battery and configured to provide a constant biasing voltage to the switch 160. The shifter operation is based on the activation or not of the switch (or transistor) 160 by means of the signal 100. Then the resulting 102 signal is an inverted version of 100 that also has the adequate levels for being read by the charger controller 50.

The voltage follower and peak detection unit 96 may be comprised of an amplifier 168; first, second, third, and fourth capacitors 170, 172, 174, 176; a diode 178; a voltage regulator 180 connected to the low voltage battery and configured to provide a constant biasing voltage to the amplifier 168; and first and second resistors 184, 186. To get the peak value of 100 the diode 178 charges the capacitor 174 only at the peak of the signal 100 and this charge remains there till it is discharged by resistor 184, a time long enough for the charger controller 50 to read it.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle charging system comprising:
   a reference circuit configured to receive a control pilot signal output from an Electronic Vehicle Supply Equipment (EVSE) system, the reference circuit processing the control pilot signal to generate reference signals;
   a shunt configured to connect the reference circuit in series with a vehicle chassis ground; and
   a charger controller configured to output a control signal to a charger power plant that facilitates controlling a charging of a high voltage battery based on the control signal, the charge controller including a compensation device and being configured to generate the control signal in response to the compensation device processing the reference signal and the compensation device being configured to compensate for noise within the reference signal resulting from the reference circuit being connected in series with the shunt.

2. The system of claim 1 wherein the charger controller includes a first input measurement node and a second input measurement node, the reference signals corresponding with signals measured at the first input measurement node and the second input measurement node.

3. The system of claim 2 wherein the compensation device includes a differential amplifier configured to output a subtracted signal and wherein the charger controller is configured to process the subtracted signal to generate the control signal.

4. The system of claim 3 wherein the differential amplifier is configured to subtract the reference signals measured at one of the first input measurement node and the second input measurement node from the reference signals measured at another one of the first input measurement node and the second input measurement node, the subtraction compensating for common mode noise resulting from the reference circuit being connected in series with the shunt.

5. The system of claim 4 wherein the reference circuit includes a reference circuit ground that is equal to an earth ground of the EVSE system.

6. The system claim 5 wherein the shunt causes the reference circuit ground to be greater than the vehicle chassis ground.

7. The system claim 6 wherein the differential amplifier is configured to bypass the shunt to be grounded directly to the vehicle chassis ground.

8. The system of claim 3 wherein the charger controller includes a voltage follower and peak detection unit configured to generate the control signal from the subtracted signal.

9. The system of claim 8 wherein the voltage follower and peak detection unit is configured to generate a first reference voltage in the event a voltage of the subtracted signal is greater than a threshold and to generate a second reference voltage in the event the voltage of the subtracted signal is less than the threshold, the control signal reflecting the first and second reference voltages, and wherein the first reference voltage indicates to the charger power plant that the high voltage battery is to be charged and the second reference voltage indicates to the charger power plant that the high voltage battery is to be prevented from being charged.

10. The system of claim 3 wherein the charger controller includes a level-shifter configured to generate the control signal from the subtracted signal.

11. The system of claim 10 wherein the level-shifter is configured to extract data from the subtracted signal, the control signal reflecting the extracted data for use by the charger power plant in determining a maximum current level for the charging of the high voltage battery.

12. The system of claim 1 wherein the reference circuit includes:
a control pilot input operable to receive the control pilot signal of the EVSE system;
an earth ground input operable to connect to an earth ground of the EVSE system;
a first resistor connected in series between the control pilot input and the earth ground input;
a first switch, a second resistor, and a second switch connected in series and in parallel with the first resistor, the first and second switches each being independently operable between an open position and a closed position according to corresponding first and second switch signals received from the charger controller.

13. The system of claim 12 wherein the charger controller includes:
a first driver configured to generate the first switch signal for controlling the first switch between the open and closed positions;
a second driver configured to generate the second switch signal for controlling the second switch between the open and closed positions; and
wherein the first driver and the second driver are each configured to bypass to the shunt to be connected directly to a vehicle chassis ground.

14. The system of claim 13 further comprising a power supply configured to power the first driver and the second driver, the power supply being further configured to bypass the shunt to be connected directly to the vehicle chassis ground.

15. A vehicle charging apparatus comprising:
a charge controller being operable with a reference circuit that (i) is connected in series with a shunt to a vehicle chassis ground of a vehicle, (ii) is configured to generate reference signals in response to receipt of a control pilot signal from an Electronic Vehicle Supply Equipment (EVSE) system that facilities powering a charger power plant included within a vehicle to charge a high voltage battery within the vehicle, (iii) includes a control pilot input operable to receive the control pilot signal of the EVSE system and an earth ground input operable to connect to an earth ground of the EVSE system, (iv) includes a first resistor connected in series between the control pilot input and the earth ground input, and (v) includes a first switch, a second resistor, and a second switch connected in series and in parallel to the first resistor in which the first switch and the second switch are each independently operable between an open position and a closed position; and
a compensation device operable to process the reference signals into a charger control signal, the charger control signal for use with the charger power plant to facilitate controlling the charging of the high voltage battery, the compensation device being configured to limit noise of the charger control signal by compensating for noise within the reference signals that results from the reference circuit being connected in series with the shunt.

16. The charger controller of claim 15 wherein the compensation device as a non-local ground to the reference circuit.

17. The charger controller claim 16 wherein the compensation device includes a differential amplifier configured to subtract reference signals measured at one of a first input measurement node and a second input measurement node of the reference circuit from reference signals measured at another one of the first input measurement node and second input measurement node to determine a subtracted signal, the subtraction compensating for common mode noise within the reference signals resulting from the reference circuit being connected in series with the shunt, the charger controller processing the subtracted signal to generate the charger control signal.

18. The charger controller of claim 15 further comprising a first driver configured to control the first switch between the open and closed positions;
a second driver configured to control the second switch between the open and closed positions; and
a power supply configured to power the first and second drivers and to bypass the shunt to be connected directly to the vehicle chassis ground.

19. A vehicle charging system comprising:
a reference circuit configured to receive a control pilot signal output from an Electronic Vehicle Supply Equipment (EVSE) system, the reference circuit processing the control pilot signal to generate reference signals, the reference circuit being connected in series through a shunt to a vehicle chassis ground, the reference circuit including i) a control pilot input operable to receive the control pilot signal of the EVSE system;
ii) an earth ground input operable to connect to an earth ground of the EVSE system;
iii) a first resistor connected in series to the control pilot input, the earth ground input, the shunt, and the vehicle chassis ground;
iv) a first switch, a second resistor, and a second switch connected in series to the control pilot input, the earth ground input, the shunt, and the vehicle chassis ground and in parallel to the first resistor, the first and second switches each being independently operable between an open position and a closed position according to corresponding first and second switch signals; and a charger controller being operable to (i) output a control signal to a charger power plant that relies on the control signal to facilitate controlling the charging of the high voltage battery and (ii) output the first and second switch signals to the first and second switches, wherein the charger controller includes a compensation device and is further operation to generate the control signal by processing the reference signals with the compensation device, and wherein the compensation device is configured to compensate for noise within the reference signal that results from the reference circuit being connected in series with the shunt.

20. The system of claim 19 wherein the compensation device includes a differential amplifier configured to subtract reference signals measured at one of a first input measurement node and a second input measurement node of the reference circuit from reference signals measured at another one of the first input measurement node and the second input measurement node to determine a subtracted signal, the subtraction compensating for common mode noise within the reference signals resulting from the reference circuit being connected in series with the shunt, the charger controller being further operable to process the subtracted signal to generate the control signal.

* * * * *

UNITED STATES PATENT AND TRADEMARK OFFICE
CERTIFICATE OF CORRECTION

PATENT NO. : 9,248,748 B2
APPLICATION NO. : 13/372805
DATED : February 2, 2016
INVENTOR(S) : Youssef Ghabbour et al.

It is certified that error appears in the above-identified patent and that said Letters Patent is hereby corrected as shown below:

In the claims,

Column 7, Line 17, Claim 6:

After "The system"
Insert -- of --.

Column 7, Line 20, Claim 7:

After "The system"
Insert -- of --.

Column 8, Line 40, Claim 17:

After "The charger controller"
Insert -- of --.

Column 9, Line 20, Claim 19 to Column 10, Line 1, Claim 19:

After "and is further"
Delete "operation" and
Insert -- operable --.

Signed and Sealed this
Nineteenth Day of July, 2016

Michelle K. Lee
*Director of the United States Patent and Trademark Office*